(12) United States Patent
Riehl et al.

(10) Patent No.: US 9,365,426 B2
(45) Date of Patent: *Jun. 14, 2016

(54) PROCESS FOR THE PRODUCTION OF NANOSTRUCTURED CARBON MATERIALS

(71) Applicant: SCNTE, LLC, Concord, MA (US)

(72) Inventors: Bill L. Riehl, Beavercreek, OH (US);
Bonnie D. Riehl, Beavercreek, OH (US);
Lee R. Riehl, Beavercreek, OH (US);
Jim R. Riehl, Beavercreek, OH (US);
Jay M. Johnson, Beavercreek, OH (US)

(73) Assignee: SCNTE, LLC, Concord, MA (US)

( * ) Notice: Subject to any disclaimer, the term of this patent is extended or adjusted under 35 U.S.C. 154(b) by 198 days.

This patent is subject to a terminal disclaimer.

(21) Appl. No.: 13/947,767

(22) Filed: Jul. 22, 2013

(65) Prior Publication Data

US 2014/0030184 A1 Jan. 30, 2014

Related U.S. Application Data

(60) Provisional application No. 61/677,072, filed on Jul. 30, 2012.

(51) Int. Cl.
| | | |
|---|---|---|
| *C01B 31/02* | (2006.01) | |
| *D01F 9/127* | (2006.01) | |
| *B82Y 30/00* | (2011.01) | |
| *B82Y 40/00* | (2011.01) | |

(52) U.S. Cl.
CPC ............ *C01B 31/0206* (2013.01); *B82Y 30/00* (2013.01); *B82Y 40/00* (2013.01); *C01B 31/02* (2013.01); *C01B 31/024* (2013.01); *D01F 9/127* (2013.01)

(58) Field of Classification Search
CPC ...................................................... C01B 31/02
See application file for complete search history.

(56) References Cited

U.S. PATENT DOCUMENTS

| | | | |
|---|---|---|---|
| 4,767,737 A * | 8/1988 | Brooks .................. 502/185 |
| 5,286,364 A | 2/1994 | Yacynych et al. | |
| 5,298,144 A | 3/1994 | Spokane | |
| 5,540,828 A | 7/1996 | Yacynych | |
| 6,107,168 A | 8/2000 | Rupp | |
| 7,011,771 B2 | 3/2006 | Gao et al. | |
| 7,138,100 B2 | 11/2006 | Smalley et al. | |
| 7,158,219 B2 | 1/2007 | Li et al. | |
| 7,160,531 B1 | 1/2007 | Jacques et al. | |
| 7,160,532 B2 | 1/2007 | Liu et al. | |
| 7,162,308 B2 | 1/2007 | O'Brien et al. | |
| 7,262,038 B2 | 8/2007 | Campbell et al. | |
| 7,304,128 B2 | 12/2007 | Jagota et al. | |
| 7,488,455 B2 | 2/2009 | Dai et al. | |
| 7,510,695 B2 | 3/2009 | Smalley et al. | |
| 7,744,843 B2 * | 6/2010 | Gogotsi ................... 423/447.1 |
| 8,168,291 B2 | 5/2012 | Shah et al. | |
| 8,252,264 B2 | 8/2012 | Riehl et al. | |
| 2003/0059364 A1 | 3/2003 | Prilutskiy | |
| 2004/0126802 A1 | 7/2004 | Brubaker | |
| 2005/0027153 A1 | 2/2005 | Ma et al. | |
| 2005/0103990 A1 | 5/2005 | Pham-Huu et al. | |
| 2006/0111005 A1 | 5/2006 | Geohegan et al. | |
| 2006/0165988 A1 | 7/2006 | Chiang et al. | |
| 2006/0251565 A1 | 11/2006 | Leis et al. | |
| 2008/0219913 A1 | 9/2008 | Gogotsi | |
| 2010/0297428 A1 | 11/2010 | Pham-Huu et al. | |
| 2011/0033367 A1 | 2/2011 | Riehl et al. | |
| 2011/0052805 A1 | 3/2011 | Bordere et al. | |

FOREIGN PATENT DOCUMENTS

| | | |
|---|---|---|
| EP | 1544607 | 6/2005 |
| JP | 2008100864 | 5/2008 |

OTHER PUBLICATIONS

Boeckl, J. et al., "Catalyst-free growth of carbon nanotubes on nonplanar polycrystalline silicon carbide substrates for electrochemical and photochemical applications," Nanotechnology, 2006; IEEE-Nano 2006; Sixth IEEE Conference, Cincinnati, Ohio, Jun. 17-20, 2006.

Tao et al., "B4C-Nanowires/Carbon-Microfiber Hybrid Structures and Composites from Cotton T-shirts," Advanced Materials, vol. 22, iss. 18 (2010).

International Search Report and Written Opinion, PCT/US13/52047 (2013).

* cited by examiner

*Primary Examiner* — Stuart Hendrickson
(74) *Attorney, Agent, or Firm* — Walters & Wasylyna LLC

(57) ABSTRACT

A process for producing a nanostructured carbon material including the steps of providing a metal or metalloid carbide substrate and reacting the carbide substrate with a reactive gas to form the nanostructured carbon material, the reactive gas and the carbide substrate being added during the reacting step.

20 Claims, 2 Drawing Sheets

PROCESS FOR THE PRODUCTION OF NANOSTRUCTURED CARBON MATERIALS

PRIORITY

This application claims priority from U.S. Ser. No. 61/677,072 filed on Jul. 30, 2012, the entire contents of which are incorporated herein by reference.

FIELD

This application relates to methods for manufacturing nanostructured carbon materials and, more particularly, to methods for manufacturing nanostructured carbon textiles.

BACKGROUND

The utility of carbon nanotubes and related fullerene structures has been severely limited due to the difficulty in incorporating significant quantities of carbon nanotubes and related fullerene structures into applications, such as composites; ballistic, blast and electromagnetic shielding; medical; electrochemical; and energy. The utility of carbon nanotubes and related fullerene structures is also inhibited by residual catalyst contamination and inconsistency.

Carbon nanotubes and related fullerene structures are typically produced using chemical vapor deposition (CVD) techniques, laser ablation techniques, and arc discharge techniques. Unfortunately, these techniques result in the formation of discrete and discontinuous filaments of crystalline carbon, which are not well suited for forming nanostructured carbon textiles.

Thus, nanostructured carbon textiles are typically produced using a spinning operation. However, due to the small scale of the fullerene structures, such spinning operations are very laborious and sensitive.

Accordingly, those skilled in the art continue with research and development efforts in the field of nanostructured carbon materials.

SUMMARY

In one embodiment, disclosed is a process for producing a nanostructured carbon material. The process may include the steps of providing a metal or metalloid carbide substrate and reacting the carbide substrate with a reactive gas to form the nanostructured carbon material, the reactive gas and the carbide substrate being added during the reacting step.

In another embodiment, disclosed is a process for producing a nanostructured carbon textile. The process may include the steps of providing a carbide textile substrate and reacting the carbide textile substrate with a reactive gas to form the nanostructured carbon textile.

In another embodiment, the disclosed process for producing a nanostructured carbon textile may include the steps of (1) providing a carbon-containing precursor, (2) decomposing the carbon-containing precursor to form a carbide textile substrate, and (3) reacting the carbide textile substrate with a reactive gas to form the nanostructured carbon textile. The reaction may take place in a reactor, and the carbide textile substrate and the reactive gas may be continuously fed to the reactor to yield a continuous nanostructured carbon textile.

Other embodiments of the disclosed process for the production of nanostructured carbon materials will become apparent from the following detailed description, the accompanying drawings and the appended claims.

DETAILED DESCRIPTION

Disclosed is a process for the production of nanostructured carbon materials, including continuous nanostructured carbon materials, in macroscopic form, such as textiles (e.g., threads, yarns, fabrics, cloths, felts and the like). The macroscopic form of nanostructured carbon may be achieved without the need for a spinning operation.

Figure 1:
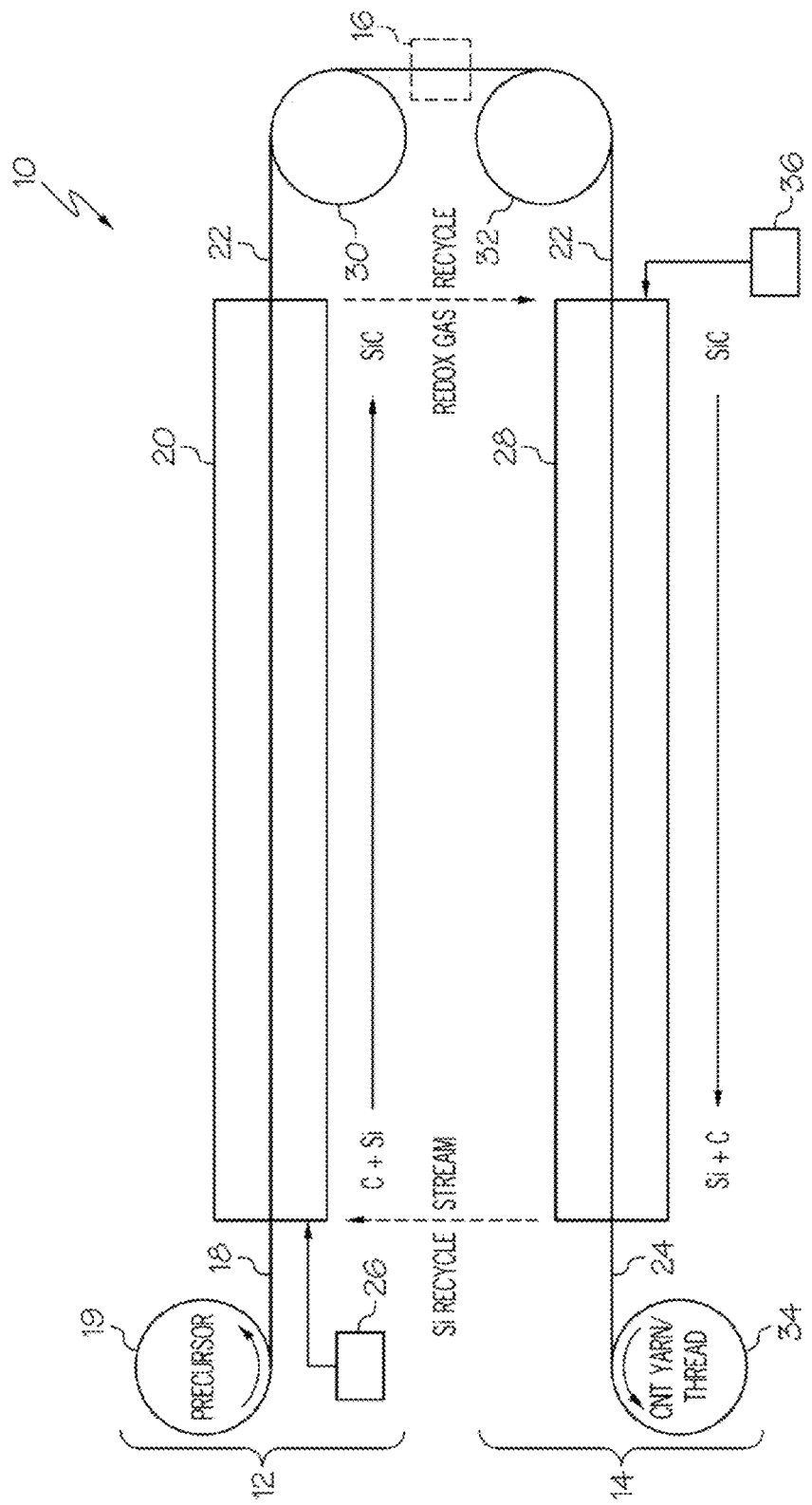
FIG. 1 is a simplified schematic of one embodiment of the disclosed process for the production of nanostructured carbon materials.

Referring to FIG. 1, one embodiment of the disclosed process for the production of nanostructured carbon textiles, generally designated 10, may include a carbide formation stage 12 and a carbide-to-fullerene conversion stage 14. Optionally, a heat treatment stage 16 may be interposed between the carbide formation stage 12 and the carbide-to-fullerene conversion stage 14.

The carbide formation stage 12 may include a precursor 18 and a first reactor 20. The first reactor 20 may convert the precursor 18 into a carbide substrate 22, such as a carbide textile substrate 22, which may then be supplied to the carbide-to-fullerene conversion stage 14 where the carbide textile substrate 22 is converted into a nanostructured carbon material 24, such as a nanostructured carbon textile 24, as is described in greater detail below.

The precursor 18 may be any carbon-containing material, such as cellulose, cotton, hemp, wool, organic polymer (e.g., nylon) or the like. The precursor 18 may be in textile form (e.g., thread, yarn, fabric, cloth, felt), and may be supplied on a spool 19 such that the precursor 18 may be continuously unwound from the spool 19 and supplied to the first reactor 20. As one specific, but non-limiting example, the precursor 18 may be a spool of cotton thread.

The first reactor 20 may convert the precursor 18 into the carbide textile substrate 22. The carbide textile substrate 22 may be a metalloid carbide, such as silicon carbide, or a metal carbide, such as barium carbide, aluminum carbide, titanium carbide or tantalum carbide. Combinations of carbides (e.g., two or more metal or metalloid carbides) are also contemplated. While silicon carbide is repeatedly used herein as an example of the composition of the carbide textile substrate 22, various carbides may be used without departing from the scope of the present disclosure.

A silicon source 26 may supply a silicon-containing material to the first reactor 20. For example, the silicon source 26 may supply SiO gas to the first reactor 20.

The first reactor 20 may be heated to a temperature sufficient to decompose the precursor 18. For example, the first reactor 20 may be heated to a temperature of about 1200° C. Therefore, the silicon source 26 may form a silicon-rich gas phase (e.g., SiO) within the first reactor 20, which may convert the precursor 18 into silicon carbide (i.e., the carbide textile substrate 22). Under appropriately controlled environmental conditions, the silicon carbide 22 formed in the first reactor 20 may be crystalline (e.g., single crystal or polycrystalline).

After siliconization, the heat treatment stage 16 may be used to create the desired crystal structure within the carbide textile substrate 22. For example, by controlling heat treatment temperatures and heat treatment times, the heat treatment stage 16 may be employed to increase (or decrease) the crystal size of the carbide textile substrate 22, which may impact the physical, electrical and/or thermal properties of the final nanostructured carbon textile 24.

Optionally, during the heat treatment stage 16, a tensile force may be applied to the carbide textile substrate 22, such as by pulling on the carbide textile substrate 22 during heat treatment. The tensile force may thin the carbide textile substrate 22 and may alter the crystal structure of the carbide textile substrate 22.

Without being limited to any particular theory, it is currently believed that formation of the nanostructured carbon textile 24 during the carbide-to-fullerene conversion stage 14 requires a carbide textile substrate 22 having a crystalline structure (e.g., single crystal or polycrystalline). Therefore, in the event that the carbide formation stage 12 yields a carbide textile substrate 22 having an amorphous structure, the heat treatment stage 16 may be employed to convert the amorphous carbide textile substrate 22 into a crystalline carbide textile substrate 22.

In a first alternative implementation, the carbide formation stage 12 may include the use of a silylation chemical applied to the precursor 18 in lieu of (or in addition to) using the silicon source 26. In one variation of the first alternative implementation, the silylation chemical may include hexamethyl disilizane, which may be applied to the precursor 18 (e.g., using a wash step), and then the treated precursor 18 may be passed through the first reactor 20. In another variation of the first alternative implementation, the silylation chemical may include silica, which may be applied to the precursor 18, and then the silica-treated precursor 18 may be passed through a reducing or inert furnace (e.g., a tungsten or graphite furnace) at approximately 1400° C. in a low oxygen environment (e.g., $10^{-4}$ Torr vacuum).

In a second alternative implementation, the precursor 18 may be formed from a silicon-containing polymer (also known as a ceramic forming polymer), such as polycarbomethylsilane. The silicon-containing polymer may be drawn, extruded, spun or similarly processed into a filament or filaments creating a textile. The silicon-containing polymer textile may then be converted to ceramic in a furnace (first reactor 20) to form the carbide textile substrate 22.

Optionally, prior to entering the carbide-to-fullerene conversion stage 14, the carbide textile substrate 22 may be doped with nitrogen. The optional nitrogen doping step may result in the formation of nitrogen-doped nanostructured carbon textile 24.

The carbide textile substrate 22 formed during the carbide formation stage 12 (or the heat treatment stage 16) may be supplied to the carbide-to-fullerene conversion stage 14. The carbide-to-fullerene conversion stage 14 may include a second reactor 28. The second reactor 28 may receive the carbide textile substrate 22, which may be guided by rollers 30, 32, and may output the nanostructured carbon textile 24 (a fullerene allotrope of carbon), which may be taken up by a spool 34.

The second reactor 28 may perform a continuous version of the conversion reaction disclosed in U.S. Ser. No. 12/936,433 filed on Oct. 5, 2010, the entire contents of which are incorporated herein by reference. Indeed, the process disclosed in U.S. Ser. No. 12/936,433 is one suitable alternative implementation of the continuous carbide-to-fullerene conversion stage 14 of the disclosed process 10.

The second reactor 28 may be a graphite plug reactor. A vacuum may be drawn in the second reactor 28. For example, the pressure within the second reactor 28 may be drawn down to 1 Torr or less, such as 0.01 Torr or less. The second reactor 28 may be heated to a temperature between about 900 and 2200° C., such as between a temperature between about 1000 and 2000° C. or a temperature between about 1400 and 1700° C.

A carbon oxide source 36 may supply a reactive gas, such as carbon oxide or a carbon oxide precursor, to the second reactor 28. Examples of suitable carbon oxides include CO, CO2 and $C_xO_y$. In one particular construction, the carbon oxide source 36 may supply ambient air (a carbon oxide precursor) to the second reactor 28, and oxygen within the ambient air may react with the graphite in the second reactor 28 to form carbon oxide in situ in the second reactor 28.

Thus, within the second reactor 28, the reactive gas may react with the carbide textile substrate 22 to form the nanostructured carbon textile 24. The resulting metal/metalloid byproduct may be continuously removed from the second reactor 28 with the nanostructured carbon textile 24.

Optionally, the process conditions may be varied through the use of an energy source (other than infrared), such as, but not limited to, microwave, RF or direct current plasma. Such variations may potentially increase the throughput of the second reactor 28, may potentially reduce process temperature, and/or may potentially increase process economy.

Accordingly, the disclosed process 10 may provide the capability of producing a continuous carbon material that is macroscopic, but comprised of a plurality of carbon nanostructures or a single, super macromolecule of carbon. The disclosed process 10 may result in the near net formation of fullerene textiles in useful forms by a predictable conversion process. Depending on the crystalline structure of the carbide textile substrate 22, the nanostructured carbon textile 24 may be broad band absorbing in the electromagnetic spectrum, as well as electronically and/or thermally conductive.

EXAMPLE

The following example discloses a non-continuous process used to form a nanostructured carbon fiber.

Nicalon silicon carbide fiber was obtained from Goodfellow USA (product number S1675721). Thirty meters of the fiber were unspooled and cut to 12 inch lengths.

Since the silicon carbide fiber was amorphous, a heat treatment stage was performed to obtain the desired crystal structure of the silicon carbide. First, the 12 inch lengths of fiber were place into an alumina crucible and the crucible was placed into a horizontal alumina tube furnace. Then, air was ramped from room temperature to 1500° C. in 6 hrs. Any sizing agents were burned off during this step. The temperature and ramp rate were governed by the alumina tube furnace, not the crystallization process. Higher temperature treatments may decrease process time. Finally, under a blanketing gas, the silicon carbide fiber was maintained at temperature for 2 weeks to allow crystal growth to occur.

After heat treatment, the temperature in the furnace was reduced to ambient (25° C.) over 6 hours and the heat treated silicon carbide fibers were removed from the furnace. The fibers were then cleaned in a 20% HF bath for 2 hours to remove any oxides or surface nitrides.

Alternatively, a crystalline silicon carbide, such as COI Ceramics Slyramic tow, could have been used, and the heat treating step may have been omitted.

The cleaned fibers were then placed into a graphite hot zone furnace (1 cubic foot total volume). The furnace was evacuated to 0.01 Torr and heated to 1700° C. 10 sccm of air was bled into the furnace, while maintaining 0.01 Torr pressure. Byproduct gas was withdrawn. The reaction was allowed to continue for 72 hours to ensure complete conversion.

Figure 2:
FIG. 2 is an electron micrograph of a carbon nanotube thread formed using the process of FIG. 1, wherein the thread is composed of multiple carbon nanotubes.

After the reaction, the furnace was cooled to ambient (25° C.) and back filled with argon. The samples were then removed. FIG. 2 is an electron micrograph of the resulting nanostructured carbon fibers, which are comprised of multiple carbon nanotubes.

Variations of this process may be used to achieve the desired properties. Furthermore, the continuous reactor described above may be used to form continuous nanostructured carbon fibers.

Although various embodiments of the disclosed process for the production of nanostructured carbon textiles have been shown and described, modifications may occur to those skilled in the art upon reading the specification. The present application includes such modifications and is limited only by the scope of the claims.

What is claimed is:

1. A process for producing a nanostructured carbon material comprising the steps of:
   providing a metal or metalloid carbide substrate;
   reacting said carbide substrate with a carbon oxide to form said nanostructured carbon material, said carbide substrate being added during said reaction.
2. The process of claim 1 wherein said carbide substrate comprises silicon carbide.
3. The process of claim 2 wherein said silicon carbide is in crystalline form.
4. The process of claim 3 wherein said crystalline form is polycrystalline form.
5. The process of claim 1 wherein said carbide substrate is modified with a dopant.
6. The process of claim 5 wherein said dopant is nitrogen.
7. The process of claim 1 wherein said providing step comprises:
   providing a carbon-containing precursor; and
   decomposing said carbon-containing precursor in the presence of a metal or metalloid to form said carbide substrate.
8. The process of claim 7 wherein said carbon-containing precursor is a textile.
9. The process of claim 7 wherein said carbon-containing precursor comprises at least one of cellulose, cotton, hemp, wool and organic polymer.
10. The process of claim 7 wherein said carbon-containing precursor comprises a silylation chemical.
11. The process of claim 7 wherein said carbon-containing precursor comprises at least one of a silicon-containing polymer and a vapor.
12. The process of claim 1 wherein said reacting step comprises continuously passing said carbide substrate through a reactor.
13. The process of claim 1 wherein said reacting step is performed at a temperature ranging from about 1000° C. to about 2200° C.
14. The process of claim 1 wherein said reacting step occurs in a reactor, and wherein said carbon oxide is formed in situ in said reactor.
15. The process of claim 1 wherein said nanostructured carbon material is a yarn or fabric.
16. A process for producing a nanostructured carbon textile comprising the steps of:
   providing a carbon-containing precursor, wherein said carbon-containing precursor is in textile form:
   decomposing said carbon-containing precursor in the presence of a metal or metalloid to form a carbide textile substrate; and
   reacting said carbide textile substrate with a reactive gas comprising carbon oxide to form said nanostructured carbon textile.
17. The process of claim 16 wherein said reacting step occurs in a reactor, and wherein said carbide textile substrate is continuously fed to said reactor.
18. The process of claim 16 wherein said carbon-containing precursor has a first shape, and wherein said nanostructured carbon textile has a second shape, said second shape being substantially similar to said first shape.
19. A process for producing a nanostructured carbon material comprising the steps of:
   providing a metal or metalloid carbide substrate;
   reacting said carbide substrate with a reactive gas to form said nanostructured carbon material, wherein said nanostructured carbon material is a yarn or fabric, said reactive gas and said carbide substrate being added during said reaction.
20. The process of claim 19 wherein said providing step comprises:
   providing a carbon-containing precursor, wherein said carbon-containing precursor is a textile; and
   decomposing said carbon-containing precursor in the presence of a metal or metalloid to form said carbide substrate.

* * * * *